United States Patent [19]

McLaughlin et al.

[11] 4,228,053
[45] Oct. 14, 1980

[54] CONCRETE PREPARATION WITH AQUEOUS SOLUTION OF PRODUCT FROM POLYETHER WITH POLYMETHYLENE POLYPHENYL POLYISOCYANATE

[75] Inventors: Alexander McLaughlin, Meriden; Reinhard H. Richter, North Haven, both of Conn.; Harold E. Reymore, Jr., Richmond, Va.

[73] Assignee: The Upjohn Company, Kalamazoo, Mich.

[21] Appl. No.: 7,588

[22] Filed: Jan. 29, 1979

Related U.S. Application Data

[63] Continuation-in-part of Ser. No. 849,859, Nov. 9, 1977, Pat. No. 4,143,014.

[51] Int. Cl.³ ............................................. C08L 75/08
[52] U.S. Cl. ........................... 260/29.2 TN; 260/37 N
[58] Field of Search ..................... 260/29.2 TN, 29.6 S

[56] References Cited

U.S. PATENT DOCUMENTS

| | | | |
|---|---|---|---|
| 2,948,691 | 8/1960 | Windemuta et al. | 260/29.2 TN |
| 3,061,470 | 10/1962 | Kuemmerer | 260/29.2 TN |
| 3,763,070 | 10/1973 | Shearing | 260/29.2 TN |
| 3,894,131 | 7/1975 | Speech | 260/29.2 TN |
| 3,897,581 | 7/1975 | Nakatsuka et al. | 260/29.2 TN |
| 3,996,154 | 12/1976 | Johnson et al. | 260/29.2 TN |
| 4,127,548 | 11/1978 | Alexander | 260/29.6 S |

*Primary Examiner*—Murray Tillman
*Assistant Examiner*—A. H. Koeckert
*Attorney, Agent, or Firm*—Denis A. Firth; John Kekich

[57] ABSTRACT

The structural strength properties of concrete and its resistance to sealing are improved by incorporating into the concrete-forming mixture an aqueous solution obtained by admixing polymethylene polyphenyl polyisocyanates with less than a stoichiometric amount of a polyethylene glycol (MW 600 to 3000) or polypropylene glycol tipped with 15 to 85 percent ethylene oxide (MW 1000 to 3500) and, within a short time of completing the admixture but during the period where said mixture is completely soluble in water, dissolving said mixture in water. Optionally, a difunctional extender is added to the solution so obtained in an amount less than that required to react with all the excess isocyanate groups.

10 Claims, No Drawings ages# CONCRETE PREPARATION WITH AQUEOUS SOLUTION OF PRODUCT FROM POLYETHER WITH POLYMETHYLENE POLYPHENYL POLYISOCYANATE

CROSS-REFERENCE TO RELATED APPLICATION

This application is a continuation-in-part of copending application Ser. No. 849,859 filed Nov. 9, 1977, now U.S. Pat. No. 4,143,014.

BACKGROUND OF THE INVENTION

1. Field of the Invention

This invention relates to improvements in the preparation of concrete and is more particularly concerned with incorporating polyisocyanate compositions into concrete to improve the properties thereof.

2. Description of the Prior Art

A variety of aqueous compositions derived from polyisocyanates is known in the art. Illustratively, aqueous emulsions, derived from polyisocyanates having all the isocyanate groups blocked by capping agents such as phenol, are described in U.S. Pat. Nos. 3,499,824; 3,933,677; 3,996,154 and 3,997,592. Water soluble solutions of the bisulfite complexes of blocked polyisocyanates and bisulfite-blocked isocyanate-terminated prepolymers are described in U.S. Pat. Nos. 3,483,189 and 3,984,365, respectively. Aqueous emulsions derived from solutions of polyisocyanates in dimethylformamide and like alkylated amides are described in U.S. Pat. No. 3,428,592.

U.S. Pat. No. 3,410,817 describes a polyurethane latex obtained by making an aqueous emulsion of an isocyanate-terminated prepolymer (optionally in the presence of a chain extender) and then precipitating the emulsion by addition of an alcohol.

U.S. Pat. No. 3,897,581 relates to the use of certain isocyanate-terminated prepolymers as water-curable adhesives for bonding of plywood and the like. Certain of the isocyanate-terminated prepolymers specifically described and exemplified are said to be soluble in water and to react therewith.

While it has been suggested that aqueous compositions of the above type can be used as sealing compositions for coating concrete and the like, it has not been suggested previously that such compositions should be incorporated into concrete during the formation thereof.

We have now found that certain novel homogeneous aqueous solutions can be incorporated into concrete during its formation and that the concrete so produced has markedly improved structural strength and other properties which will be described hereafter.

SUMMARY OF THE INVENTION

This invention comprises an improved process for the preparation of concrete wherein the improvement comprises incorporating into the concrete-forming mixture from about 0.1 parts to about 10 parts by weight, based on solids content, per 100 parts by weight of concrete-forming mixture, of an aqueous solution (I) which comprises the product obtained by admixing at a temperature in the range of 25° C. to 100° C. (a) a polyether glycol selected from the group consisting of polyethylene glycols having a molecular weight from 600 to 3000 and polypropylene glycols capped with from 15 to 85 percent by weight of ethylene oxide and having a molecular weight from 1000 to 3500 with (b) a mixture of polymethylene polyphenyl polyisocyanates containing from 25 to 90 percent by weight of methylenebis(phenyl isocyanate) the proportions of (a) and (b) being such that there are from 0.1 to 0.99 equivalents of polyol per equivalent of polyisocyanate, and, during the time when the product so obtained is still completely soluble in water, admixing said product with sufficient water to form a clear aqueous solution.

The invention also comprises the above improved process wherein the aqueous solution which is incorporated into the concrete-forming mixture also contains a difunctional extender in an amount less than that required to react with all the free isocyanate groups theoretically remaining after the admixture of the polyisocyanate and the polyether glycol.

DETAILED DESCRIPTION OF THE INVENTION

The process of making concrete, by mixing cement, sand, gravel and or other aggregates with sufficient water to cause the cement to set and bind the entire mass, is so well-known in the art as not to require detailed discussion in this specification. The process of the invention comprises an improvement in the conventional method of making concrete, the improvement consisting in the incorporation into the concrete-forming mixture of an aqueous solution derived from a polyisocyanate and a polyether glycol in the manner described hereinafter. The incorporation of this solution into the concrete-forming reaction mixture can be accomplished by admixing the solution with the water to be used in making the concrete or by adding the solution as a separate component to the concrete-forming mixture.

The amount of the solution in question which is incorporated into the concrete in accordance with the process of the invention can vary within wide limits and is partly dependent on the particular degree of enhancement of properties of the concrete which it is desired to accomplish. Advantageously, the amount of solution employed is such that the amount of dissolved solids thereby introduced into the concrete-forming mixture in the form of said solution is within the range of about 0.1 parts to about 10 parts by weight, per 100 parts by weight of concrete. Preferably, the amount of solution employed is such that the amount of dissolved solids thereby introduced into the concrete-forming mixture in the form of said solution is within the range of about 0.5 parts to about 5 parts by weight, per 100 parts by weight of concrete.

The aqueous solutions (I) which are employed as additives in the formation of concrete in accordance with the invention are novel products which were derived as a result of the unexpected finding that, when certain organic polyisocyanates and certain polyether polyols are brought together in the manner hitherto employed to prepare an isocyanate-terminated prepolymer, there is a relatively short period, after the reactants have been brought together, in which the mixture of reactants will dissolve completely in water to give a clear solution which remains stable on storage for prolonged periods.

This finding appears to be confined to the product obtained by bringing together a very limited group of organic polyisocyanates and a very limited group of polyether polyols. The organic polyisocyanates in question are polymethylene polyphenyl polyisocyanates containing from about 25 to about 90 percent by weight of methylenebis(phenyl isocyanate) the remainder of said mixture being polymethylene polyphenyl polyisocyanates of functionality higher than 2.0. Such polyisocyanates and methods for their preparation are well-known in the art. These polyisocyanates can also be employed in various modified forms. One such form comprises a polymethylene polyphenyl polyisocyanate as above which has been subjected to heat treatment, generally at temperatures from about 150° C. to about 300° C., until the viscosity (at 25° C.) has been increased to a value within the range of about 800 to 1500 centipoises. Another modified polymethylene polyphenyl polyisocyanate is one which has been treated with minor amounts of an epoxide to reduce the acidity thereof in accordance with U.S. Pat. No. 3,793,362.

Preferred polymethylene polyphenyl polyisocyanates are those which contain from about 35 to about 65 percent by weight of methylenebis(phenyl isocyanate). Particularly preferred are the polymethylene polyphenyl polyisocyanates which contain about 50 percent of methylenebis(phenyl isocyanate).

The polyether polyols which are employed in the preparation of the aqueous solutions (I) are the polyether glycols defined hereinabove. Preferred polyether polyols are polyethylene glycols having molecular weights of 1000 to 1400 and polypropylene glycols capped with about 45% by weight of ethylene oxide and having molecular weights of 2000 to 3000.

In preparing the compositions of the invention the polymethylene polyphenyl polyisocyanate (II) and the polyether glycol (III) are brought together in any order and advantageously with agitation. The proportion of polyisocyanate (II) to glycol (III) is advantageously within the range of 1.1 to 10 equivalents of polyisocyanate per equivalent of polyol and preferably is within the range of 2 to 5 equivalents of polyisocyanate per equivalent of polyol.

The admixture of polyisocyanate (II) and polyol (III) can be carried out at ambient temperature (25° C.) but is advantageously carried out at slightly elevated temperatures within the range of 35° C. to 100° C. and preferably within the range of about 55° C. to about 65° C. The admixture is generally carried out under an inert atmosphere such as nitrogen and with exclusion of moisture.

The conditions described above for the admixture of the polyisocyanate (II) and polyol (III) generally follow those commonly employed in the preparation of isocyanate-terminated prepolymers. However, in this case of the preparation of the isocyanate-terminated prepolymer the reaction between the polyol and polyisocyanate is generally allowed to proceed to completion, i.e. until there is no further fall in isocyanate content, and the resulting product is generally of relatively high molecular weight and viscosity. In contrast, in the present instance, the mixture of polyisocyanate (II) and glycol (III) is only allowed to remain as such for a very short period after the bringing together of the two components has been completed. Thus, it has been found that, within a short period after admixture is complete, said period varying from a few minutes to two hours depending upon the particular components employed, the mixture is completely miscible with water to form a clear solution. In most instances this period of water miscibility is not very long and when the period has been exceeded the mixture of polyisocyanate and polyol no longer dissolves in water but reacts with the water to yield a foam.

The point at which any given mixture of polyisocyanate (II) and glycol (III) first becomes completely miscible with water, and the duration of this period of water miscibility, vary greatly depending upon the nature of the two components. In general, it is found that, as the molecular weight of the glycol increases, the time of onset of the water miscibility, after admixture of polyisocyanate and glycol is complete, becomes somewhat longer but the duration of the period of water miscibility is markedly increased. The time of onset and duration of the period of water miscibility can be determined readily by a process of trial and error in any given instance.

While it is surprising to find this phenomenon of water miscibility in the newly admixed polyisocyanate (II) and glycol (III) it is even more surprising to find that the aqueous solutions derived by dissolving the mixture of polyisocyanate and glycol are stable on storage and are possessed of highly useful properties. The proportion in which the mixture of polyisocyanate (II) and glycol (III) is combined with water can vary over a wide range. Advantageously, the proportion is within the range of about 1 to about 20 parts by weight of mixture per 100 parts by weight of water. Higher proportions, up to about 25 parts by weight of mixture per 100 parts by weight of water can be obtained by evaporating a portion of the water from the mixture. Such evaporation does not adversely affect the composition of the mixture or its ability to function in accordance with the invention. Preferably the proportion is within the range of about 10 to about 15 parts by weight of mixture per 100 parts by weight of water.

There is no outward sign, such as evolution of gas, of any reaction between the free isocyanate groups in the mixture of polyisocyanate (II) and glycol (III) at the instant of mixing the latter with water. However, there is a very slow evolution of gas, beginning a few seconds after the mixture of polyisocyanate (II) and glycol (III) is blended with the water, that continues for approximately 4 hours, presumably with the formation of ureas and/or amines. The exact nature of the reaction which takes place after the mixture of polyisocyanate (II) and glycol (III) are brought together is not known nor is the precise composition of the stable aqueous solution formed in accordance with the above process known with certainty.

The aqueous solutions which are obtained in accordance with the above procedures are amber colored, low viscosity (10 to 1000 cps.) fluids which show no visible sign of change and no tendency to deposit solids on storage for prolonged periods.

In a particular embodiment of the process of the invention there is included in the water used to dissolve the mixture of polyisocyanate (II) and glycol (III), or there is added to the solution so obtained, a minor amount of a polyfunctional extender. Advantageously, the said extender is employed in an amount which corresponds to about 0.01 to about 0.5 equivalents per equivalent of polyisocyanate employed in the original mixture of polyisocyanate (II) and glycol (III). Preferably the amount of polyfunctional extender employed is within the range of about 0.1 to about 0.3 equivalents per equivalent of polyisocyanate originally employed.

The introduction of the extender in the above manner and in the above amounts does not affect the storage stability of the aqueous solution (I) in any manner but does enchance the properties of the products obtained from the aqueous solution (I).

Any of the di- and polyfunctional extenders known in the art can be employed for the above purpose. Illustratively said extenders include polyamines, polyhydric alcohols, amino alcohols and the like having equivalent weights up to about 500 such as ethylene diamine, trimethylenediamine, hexamethylenediamine, 1,3-butanediamine, cyclohexanediamine, di(aminocyclohexyl)methane, di(aminophenyl)methane, polymethylene polyphenyl polyamines, phenylenediamine, toluenediamine, 1,4-diethylbenzene-$\beta,\beta'$-diamine, 1,4-dipropylbenzene-$\gamma,\gamma'$-diamine, tri(aminophenyl)methane, ethylene glycol, propylene glycol, dipropylene glycol, butane-1,4-diol, glycerol, pentaerythritol, hydroquinone di(2-hydroxyethyl)ether, resorcinol di(2-hydroxyethyl)ether, diethanolamine, dipropanolamine, ethanolamine and the like. A preferred class of extenders are the aliphatic polyamines of which hexamethylenediamine is representative.

The incorporation of the aqueous solutions (I) into concrete-forming mixtures in accordance with the invention gives rise to concrete which has improved structural strength and like properties. Illustratively, it is found that the flexural modulus of the concrete is significantly improved and the resistance to scaling, which occurs when the concrete is exposed to the effects of moisture over a plurality of freeze-thaw cycles, is markedly increased.

It is to be understood that any of the usual additives and/or reinforcing agents or structural reinforcing members which are commonly employed in the art of making and casting or molding concrete, can be employed in preparing concrete in accordance with the invention, the novel feature of the latter comprising the introduction, into the concrete-forming mixture, of the aqueous solutions (I) as discussed above.

The following preparations and examples describe the manner and process of making and using the invention and set forth the best mode contemplated by the inventors of carrying out the invention but are not to be construed as limiting.

Preparation 1

A total of 336.5 g. (2.53 equivalents) of a polymethylene polyphenyl polyisocyanate containing approximately 60 percent of methylenebis(phenyl isocyanate) [isocyanate equivalent=133; viscosity 80 cps. at 25° C.] was charged to a reaction kettle and stirred under an atmosphere of nitrogen while the temperature of the kettle and contents was raised to 60° C. To the isocyanate was added rapidly, with stirring, over a period of 5 minutes, a total of 500 g. (1 equivalent) of Carbowax 1000 (a polyethylene glycol of molecular weight 1000; Union Carbide Corporation). The temperature was maintained at 60°±5° C. during the addition. After the addition was complete, the mixture was maintained at the same temperature with stirring and aliquots were removed at approximately five minute intervals and mixed with approximately 6 times their volume of water. It was found that the early aliquots gave milky fluids but that, at approximately 45 minutes after the admixture of polyisocyanate and glycol was completed, the aliquot gave a clear solution in water. Subsequent aliquots also gave clear solutions until 60 minutes after the admixture of polyisocyanate and glycol. Thereafter the aliquots reacted with the water and gave foams.

The above experiment was repeated and, approximately 50 minutes after the admixture of polyisocyanate and glycol was completed, the mixture was added to water (at the rate of 100 ml. of water per 15 g. of mixture) with stirring. The clear amber colored solution so obtained showed no tendency to deposit solids even after 8 months of storage at room temperature (approximately 20° C.). This solution is referred to hereinafter as Solution A.

The above experiment was repeated but increasing the proportion of polymethylene polyphenyl polyisocyanate to 572 g. (4.3 equivalents). It was found that for a period of 10 minutes, between 40 and 50 minutes after admixture of the polyisocyanate and glycol was complete, the product was miscible with water but gave opaque rather than clear solutions.

Similarly, repeating the above experiment but replacing the Carbowax 1000 by an equivalent quantity of Carbowax 600 (polyethylene glycol of molecular weight 600; Union Carbide Corporation) gave a mixture which was partially, but not completely, soluble in water for a period of 10 to 20 minutes after admixture of the polyisocyanate and glycol was complete.

Preparation 2

Using the procedure exactly as described in Preparation 1 with the sole exception that the Carbowax 1000 was replaced by an equivalent amount of Poly G-427 (a polypropylene glycol capped with 45 percent by weight of ethylene oxide; molecular weight 2000; Olin Corporation), there was obtained a mixture of polyisocyanate and glycol which, beginning at 35 minutes after addition of the polyol was complete and continuing for approximately 85 minutes thereafter, was completely soluble in about 6 times its own volume of water to give clear amber colored solutions. A solution prepared in this manner in a repeat experiment is referred to hereinafter as Solution B.

Repeating the above experiment but replacing the Poly G-427 by an equivalent amount of Poly G-433 (a polypropylene glycol capped with 45 percent by weight of ethylene oxide and having a molecular weight of 1300; Olin Corporation) there was obtained a product which gave emulsions but not clear solutions when added to water during a period from 35 to 120 minutes after addition of the glycol to polyisocyanate was complete.

Similarly, repeating the above described experiment but replacing the Poly G-427 by an equivalent amount of Poly G-423 (a polypropylene glycol capped with 11 percent by weight of ethylene oxide; molecular weight 2000; Olin Corporation) it was found that admixture of polyisocyanate and polyol could not be accomplished because of lack of miscibility of one component with the other.

Preparation 3

Using the procedure described in Preparation 1, but replacing the Carbowax 1000 there used by an equivalent amount of Carbowax 1540 (polyethylene glycol molecular weight 1400; Union Carbide Corporation), there was obtained a mixture which, beginning 40 minutes after admixture was complete and continuing until about 120 minutes after admixture was complete, dissolved completely in water to give a clear amber-colored solution.

In contrast, using the procedure of Preparation 1, but replacing the Carbowax 1000 by an equivalent amount of Carbowax 1540 and increasing the amount of polymethylene polyphenyl polyisocyanate to 572 g. (4.3 equivalents) there was obtained a mixture which, beginning at about 30 minutes after admixture was complete and continuing for the next 90 minutes thereafter, formed an emulsion on admixture with water in the proportion of 100 ml. of water per 15 g. of mixture. However, increasing the proportion of water to about 225 ml. of water per 15 g. of mixture gave a clear solution.

Preparation 4

Using the procedure described in Preparation 1, but replacing the Carbowax 1000 there used by an equivalent amount of a polypropylene glycol capped with 45 percent by weight of ethylene oxide and having a molecular weight of 3000, there was obtained a mixture which, beginning about 60 minutes after admixture was complete and continuing for about 60 minutes thereafter, was completely soluble in about 6 times its volume of water to give a clear amber-colored solution.

Preparation 5

Using the procedure described in Preparation 1, but replacing the polymethylene polyphenyl polyisocyanate there used by 354.2 g. (2.53 equivalents) of a polymethylene polyphenyl polyisocyanate containing approximately 35 percent by weight of methylenebis(phenyl isocyanate) and having an isocyanate equivalent of 140, there was obtained a mixture which, beginning about 10 minutes after admixture was complete and continuing for approximately the next 20 minutes, was completely soluble in about 6 times its own volume of water to give clear amber-colored solutions. A solution prepared in this manner in a repeat experiment is referred to hereinafter as Solution C.

Preparation 6

Using the procedure described in Preparation 1, but reducing the amount of polymethylene polyphenyl polyisocyanate to 314 g. (2.36 equivs.), there was obtained a mixture of polyisocyanate and glycol which exhibited complete solubility in water within the period of about 25 to about 85 minutes after admixture was complete. The bulk of the mixture was dissolved in water, at the rate of 15 parts by weight of mixture per 100 parts by weight of water, at about 80 minutes after admixture of the isocyanate and glycol was complete. The clear, amber-colored solution so obtained is referred to hereinafter as Solution D.

Preparation 7

The procedure described for the preparation of Solution A in Preparation 1 was repeated exactly as described with the sole exception that 11.6 g. (0.2 equivs.) of hexamethylenediamine was added to the water used to prepare the final solution. The clear amber-colored solution showed no sign of deposition of solid or any other evidence of reaction or change after 7 months of storage. This solution is referred to hereinafter as Solution E.

EXAMPLE 1

Three samples of concrete were prepared from a proprietary cement mixture (3 parts of sand to 1 part of Portland cement). In each case the amount of cement mixture employed was 1000 gm. and, in the case of Sample 1, the cement mixture was admixed, by manual stirring, with 143 gm. of water. In the case of Sample 2, the cement mixture was admixed, by manual stirring, with 72 gm. of Solution A (prepared as described in Preparation 1) which had been diluted with 71 gm. of water. In the case of Sample 3, the cement mixture was admixed, by manual stirring, with 143 g. of Solution A. Each of the concrete-forming mixtures so prepared was cast into a mold (5"×5"×1") and allowed to set. The samples of concrete so obtained were cut into 5"×1"×1" size strips and then submitted to testing in accordance with ASTM C-293-68 to determine the physical properties which are set forth in the following Table.

TABLE 1

| Sample | 1 | 2 | 3 |
|---|---|---|---|
| density pcf | 125 | 119 | 122 |
| Flexural Strength psi | 940 | 920 | 1020 |
| Flexural Modulus × $10^3$: psi | 604 | 786 | 722 |
| Content of solids added via Solution A :% | 0 | 0.8 | 1.64 |

EXAMPLE 2

Using the materials and proportions set forth in Table 2 and the procedure described in Example 1 but substituting a mold of dimensions 6"×1"×½", there were prepared three further samples of concrete which were then submitted to the scaling resistance test set forth in ASTM 672-72T. The results of these tests are summarized in Table 2 from which it will be seen that Samples 5 and 6, each of which had been prepared in accordance with the invention, performed in markedly better manner than did control Sample 4.

TABLE 2

| | Sample | | |
|---|---|---|---|
| | 4 | 5 | 6 |
| Cement mixture; gms. | 1000 | 1000 | 1000 |
| Water; gms. | 200 | 100 | 0 |
| Solution A; gms. | 0 | 100 | 200 |
| Scaling test: | | | |
| No. of specimens in test | 4 | 6 | 5 |
| After 10 cycles | 1 broken 2 cracked 1 OK | all OK | all OK |
| After 15 cycles | all broken | 2 broken 4 OK | all OK |
| After 20 cycles | all broken | all broken | all OK |
| After 25 cycles | all broken | all broken | all OK |

We claim:

1. An improved process for the preparation of concrete wherein the improvement comprises incorporating into the concrete-forming mixture from about 0.1 parts to about 10 parts by weight, based on the solids content thereof, per 100 parts by weight of concrete-forming mixture, of an aqueous solution which comprises the product obtained by admixing at a temperature in the range of 25° C. to 100° C. (i) a polyether glycol selected from the group consisting of polyethylene glycols having a molecular weight from 600 to 3000 and polypropylene glycols capped with from 15 to 85 percent by weight of ethylene oxide and having a molecular weight from 1000 to 3500, with (ii) a mixture of polymethylene polyphenyl polyisocyanates containing from 25 to 90 percent by weight of methylenebis(phenyl isocyanates) the remainder of said mixture being polymethylene polyphenyl polyisocyanates of functionality higher than 2.0, the proportions of (i) and (ii) being such that there are from 0.1 to 0.99 equivalents of polyol per equivalent of polyisocyanate, and, during the time when the product so obtained is completely soluble in water, admixing said product with water in a proportion of from 1 to 20 parts by weight of said product per 100 parts by weight of water to form a clear aqueous solution.

2. A process according to claim 1 wherein an amount of an extender less than that required to react with all the free isocyanate groups is incorporated into the said aqueous solution.

3. A process according to claim 2 wherein the extender is hexamethylenediamine.

4. A process according to claim 1 wherein the amount of water, in parts by weight, employed to prepare the aqueous solution, if from five to ten times the combined weight of polyether glycol and polyisocyanate.

5. A process according to claim 1 wherein the polyisocyanate employed to prepare said aqueous solution contains approximately 60 percent by weight of methylenebis(phenyl isocyanate) the remainder of said mixture being polymethylene polyphenyl polyisocyanates of higher functionality.

6. A process according to claim 1 wherein the polyisocyanate employed to prepare said aqueous solution contains about 35 percent by weight of methylenebis(phenyl isocyanate) the remainder of said mixture being polymethylene polyphenyl polyisocyanates of higher functionality.

7. An improved process for the preparation of concrete wherein the improvement comprises incorporating into the concrete-forming mixture from about 0.1 parts to about 10 parts by weight based on solids content thereof, per 100 parts by weight of concrete-forming mixture, of an aqueous solution which comprises the product obtained by admixing, at a temperature in the range of about 25° C. to about 100° C., (i) a polyethylene glycol having a molecular weight from 600 to 3000 with (ii) from 2 to 5 equivalents, per equivalent of said glycol, of a mixture of polymethylene polyphenyl polyisocyanates containing from 25 to 90 percent by weight of methylenebis(phenyl isocyanate) the remainder of said mixture being polymethylene polyphenyl polyisocyanates of functionality higher than 2.0, and, during the time when said admixture is completely soluble in water, dissolving said product in water in a proportion of from 1 to 20 parts by weight of said product per 100 parts by weight of water to form a clear aqueous solution.

8. A process according to claim 7 wherein the water employed to prepare the said aqueous solution also contains from 0.01 to 0.5 equivalents, per equivalent of polyethylene glycol, of hexamethylenediamine.

9. An improved process for the preparation of concrete wherein the improvement comprises incorporating into the concrete-forming mixture from about 0.1 parts to about 10 parts by weight based on solids content thereof, per 100 parts by weight of concrete-forming mixture, of an aqueous solution which comprises the product obtained by admixing, at a temperature in the range of about 25° C. to about 100° C., (i) a polypropylene glycol capped with from 15 to 85 percent by weight of ethylene oxide a molecular weight from 1000 to 3500 with (ii) from 2 to 5 equivalents, per equivalent of said glycol, of a mixture of polymethylene polyphenyl polyisocyanates containing from 25 to 90 percent by weight of methylenebis(phenyl isocyanate) the remainder of said mixture being polymethylene polyphenyl polyisocyanates of functionality higher than 2.0, and, during the time when said admixture is completely soluble in water, dissolving said product in water in a proportion of from 1 to 20 parts by weight of said product per 100 parts by weight of water to form a clear aqueous solution.

10. A process according to claim 9 wherein the water employed to prepare the said aqueous solution also contains from 0.01 to 0.2 equivalents, per equivalent of polyisocyanate, of hexamethylenediamine.

* * * * *